H. B. KEAN.
CHERRY PICKER.
APPLICATION FILED NOV. 3, 1920.
1,364,766.
Patented Jan. 4, 1921.
Fig. 1.
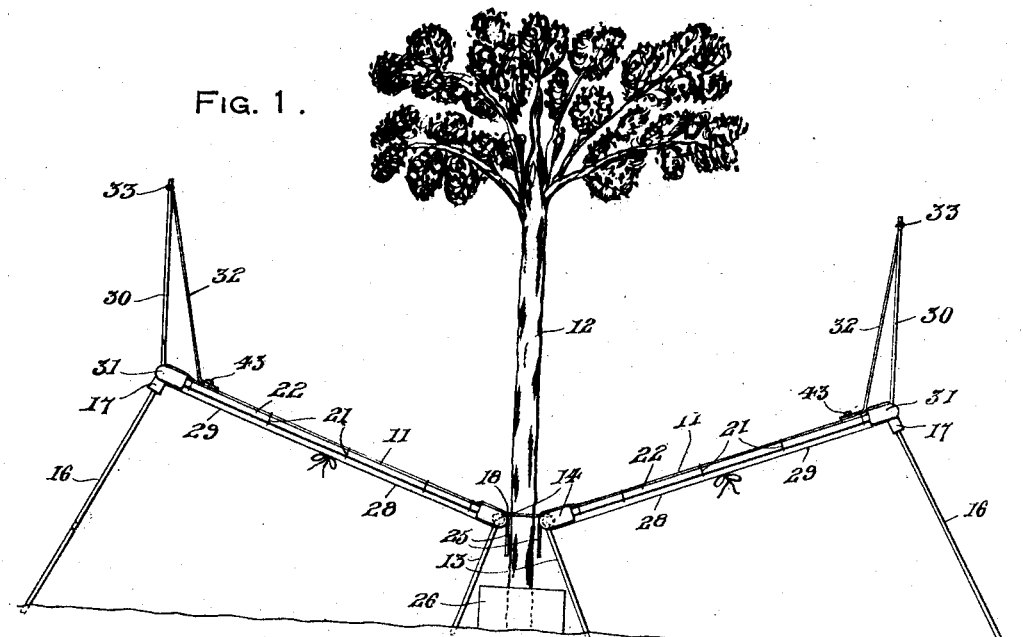
Fig. 2.
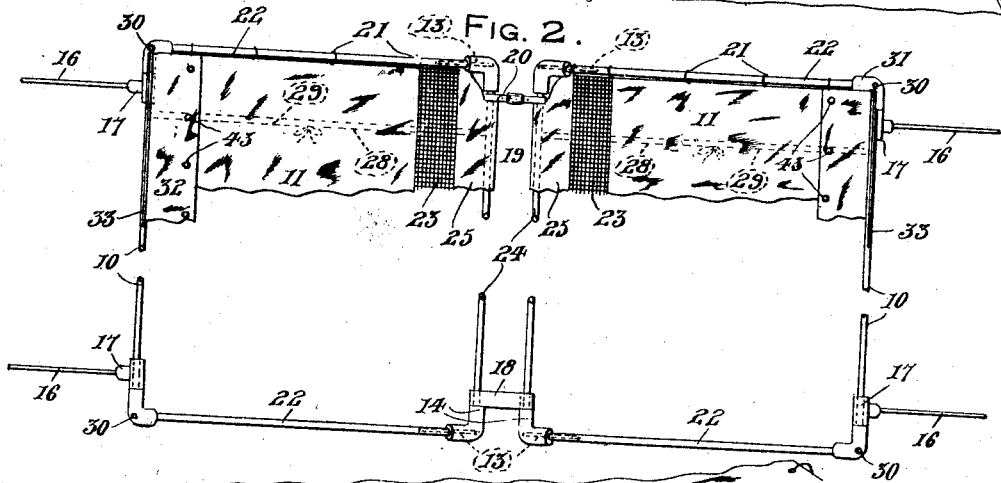
Fig. 3.
INVENTOR.
H. B. Kean
BY
J. R. Bryant,
ATTORNEY.

UNITED STATES PATENT OFFICE.

HENRY B. KEAN, OF STANLEY, NEW YORK.

CHERRY-PICKER.

1,364,766.

Specification of Letters Patent. Patented Jan. 4, 1921.

Application filed November 3, 1920. Serial No. 421,561.

*To all whom it may concern:*

Be it known that I, HENRY B. KEAN, a citizen of the United States of America, residing at Stanley, in the county of Ontario and State of New York, have invented certain new and useful Improvements in Cherry-Pickers, of which the following is a specification.

The primary object of the invention is the provision of means for picking cherries or similar fruit in large quantities expeditiously without bruising or otherwise damaging the fruit, the construction of the device being easy and inexpensive to manufacture.

A further object of the invention is the provision of means for collecting fruit such as cherries from a tree and depositing the fruit in a cleanly and undamaged state in suitable receptacles provided therefor, the device being readily movable from one tree to another during the harvesting operation.

A still further object of the invention is the provision of a movable device for gathering cherries from a tree and providing fruit directing and cushioning means preventing injury to the fruit, such means being readily removable for washing, rendering the device sanitary.

With these general objects in view, the invention consists in the novel form, combination and arrangement of parts hereinbefore and arrangement of parts hereinafter more fully described in connection with the accompanying drawing and in which like reference characters designate corresponding parts throughout the several views.

In the drawing,

Figure 1 is an elevational view of the device in position for use adjacent a cherry tree, Fig. 2 is a top plan view thereof with parts broken away and removed, and Fig. 3 is a perspective view of a corner portion of one of the apron members employed with the device removed from the frame work thereof.

Referring more in detail to the drawing, the invention broadly consists of two rectangular frames 10 carrying fruit receiving aprons 11 and positioned in spaced relations at opposite sides of a tree such as 12 whereat by the fruit will be received and cushioned in its fall by said aprons 11. Legs 13 are rigidly secured to the inner corner pieces 14 of the frames 10 for engaging the ground while relatively longer legs 16 are pivoted by means of sleeves 17 in spaced relations at the outer ends of the frames 10.

In this manner, the frames 10 are readily set up in parallelism at opposite sides of the tree 12 supported by the legs 13 and 16 inclined downwardly and inwardly toward the tree. A link 18 loosely connects the inner ends of the frames 10 together, the tree 12 being preferably substantially centrally of the space 19 between the frames while a removable strap 20 connects the inner ends of the frames 10 together at the opposite side of the device from the link 18.

An apron 11 is provided for each frame 10 and is formed of fabric such as canvas having strings 21 secured to the opposite edges thereof for tying around the side rails 22 of the frames 10. An insert of netting 23 is provided in the apron 11 at a point slightly spaced from the inner bar 24 of the carrying frame for the purpose of permitting dirt and foreign material to pass therethrough for falling upon the ground. An inner end portion 25 of the apron 11 overlies the inner rail 24 of the frame 10 forming a depending flap adjacent the tree 12 whereby the portions 25 of the opposite aprons 11 direct the fruit from the inclined aprons downwardly into one or more receptacles or baskets 26 placed adjacent to the tree 12 beneath the space 19 between the frames 10, as may be found desirable.

A strip 27 carried transversely of the apron portion 25 bears upon the inner rail 24 of the frame 10 and has a plurality of strings 28 adapted to be tied to corresponding strings 29 carried by the upper and outer end of the apron 11 whereby the apron is firmly secured upon the frame 10. Upright posts 30 are detachably carried by the outer corner members 31 of the frames 10, an auxiliary apron 32 being provided for each frame 10 with its upper end secured as at 33 to the post 30 for transverse positioning at an obtuse angle to the adjacent apron 11 and forming an end member or partial inclosure for preventing the fruit from bounding off of the apron 11. Detachable fasteners 43 are provided for connecting the inner edge of the auxiliary aprons 32 to the surface of the apron 11. The legs 13 and posts 30 preferably have threaded connection with the corner members 14 and 31 respectively of the frames 10, rendering them easily detachable for purposes of shipment and storage. By unfastening the strings 21, 28 and 29 and the fasteners 43, the aprons 11 may be removed from the frames 10 for cleaning the aprons. The manner of readily assembling as well as disassembling the device and also its installation for operation adjacent the tree 12 will be at once apparent from this detail description, it being further seen that by shaking or otherwise agitating the tree 12, the fruit will fall upon the aprons 11 and gravitate over the inner tree portions 25 into the receptacles 26 for ready removal when desired. The fruit upon a tree may be quickly gathered in this manner and by removing the strap 20 the device is readily conducted from one tree to another and again set up for use.

While the form of the invention herein set forth is the preferable embodiment thereof, it is nevertheless to be understood that changes may be made therein without departing from the spirit and scope of the invention.

My fruit picker is especially advantageous in harvesting fruit from trees that are limbed close to the ground as the device may be readily positioned beneath the low branches of trees having short trunks. Where trees are growing close together, one device may be set for harvesting fruit from two or more trees positioned between the frames and when found desirable, the legs 13 may be removed and the inner bars 24 rested upon the fruit-receiving receptacles 26. The deflectors 32 are for use primarily when harvesting fruit from tall trees and prevent the fruit from jumping off of the frames, the posts 30 being preferably adjustable upon the corner members 31 by bending the posts 30 and thereby adjusting the deflectors 32.

What is claimed as new is:—

1. A cherry picker comprising rectangular frames adapted for positioning at opposite sides of a tree, supporting legs for the frames adapted for positioning the frames inwardly inclined toward the tree when in use, aprons having dirt screening portions mounted upon the frames with the inner ends of the aprons oppositely positioned depending toward the ground when the device is in operation, upright posts at the outer upper corners of the frames, and an auxiliary apron secured between the posts at each end of the device and detachably connected adjacent the outer ends of the aprons.

2. A cherry picker comprising a rectangular frame, legs carried by the frame adapted for mounting the latter in an inclined position upon the ground, an apron having a portion detachably connected to the sides of the frame with a further portion of the apron forming the netting adjacent the lower end of the frame with a terminal lower end portion of the apron overlying the lower end of the frame and depending toward the ground.

3. A cherry picker comprising a rectangular frame, legs carried by the frame adapted for mounting the latter in an inclined position upon the ground, an apron having a portion detachably connected to the sides of the frame with a further portion of the apron forming the netting adjacent the lower end of the frame with a terminal lower end portion of the apron overlying the lower end of the frame and depending toward the ground, a transverse strip carried by the apron adapted for overlying the lower rail of the frame when the apron is attached thereto, and strings carried by said strip and the opposite end of the apron adapted for detachable connection when the device is in use.

4. A cherry picker comprising a rectangular frame, legs carried by the frame adapted for mounting the latter in an inclined position upon the ground, an apron having a portion detachably connected to the sides of the frame with a further portion of the apron forming the netting adjacent the lower end of the frame with a terminal lower end portion of the apron overlying the lower end of the frame and depending toward the ground, substantially vertical posts detachably carried by the upper corner portions of the frame, and auxiliary aprons attached to said posts with their inner edges detachably secured spaced from the upper edge of the apron.

5. A cherry picker comprising a rectangular frame, legs carried by the frame adapted for mounting the latter in an inclined position upon the ground, an apron having a portion detachably connected to the sides of the frame with a further portion of the apron forming the netting adjacent the lower end of the frame with a terminal lower end portion of the apron overlying the lower end of the frame and depending toward the ground, a transverse strip carried by the apron adapted for overlying the lower rail of the frame when the apron is attached thereto, strings carried by said strip and the opposite end of the apron adapted for detachable connection when the device is in use, substantially vertical posts detachably carried by the upper corner portions of the frame, and auxiliary aprons attached to said posts with their inner edges detachably secured spaced from the upper edge of the apron.

In testimony whereof I affix my signature.

HENRY B. KEAN.